United States Patent [19]

Larkin et al.

[11] Patent Number: 5,076,635

[45] Date of Patent: Dec. 31, 1991

[54] REAR WINDOW FOR A TRACTOR CAB

[75] Inventors: John J. Larkin; Edward H. Kiefer; Robert J. White, all of Dubuque, Iowa

[73] Assignee: Deere & Company, Moline, Ill.

[21] Appl. No.: 638,478

[22] Filed: Jan. 4, 1991

[51] Int. Cl.$^5$ ............................................. B62D 33/06
[52] U.S. Cl. ................................... 296/146; 296/190; 49/127
[58] Field of Search ............... 296/190, 201, 155, 146; 49/127, 208

[56] References Cited

U.S. PATENT DOCUMENTS

| 3,866,969 | 2/1975 | Sandrock et al. | 296/190 |
| 4,443,035 | 4/1984 | Saemann | 296/190 |
| 4,518,195 | 5/1985 | Tindall et al. | 296/148 |
| 4,880,269 | 11/1989 | Jensen et al. | 296/190 |
| 4,986,593 | 1/1991 | Lohmann | 296/190 |

OTHER PUBLICATIONS

Operator's Manual, John Deere 710C Backhoe Loader, John Deere Dubuque Works, OM-T125604 Issue L8.

*Primary Examiner*—Margaret A. Focarino
*Assistant Examiner*—Joseph D. Pape

[57] ABSTRACT

The invention is directed to a flat rear window for a tractor having a middle panel that is slidably coupled to the frame so it can be opened by sliding it downwardly so that it overlaps a bottom stationary panel. The middle panel is provided with guide pins that engage slots formed in guide tracks mounted to the cab. Latches are used to hold the middle panel in its closed position.

19 Claims, 3 Drawing Sheets

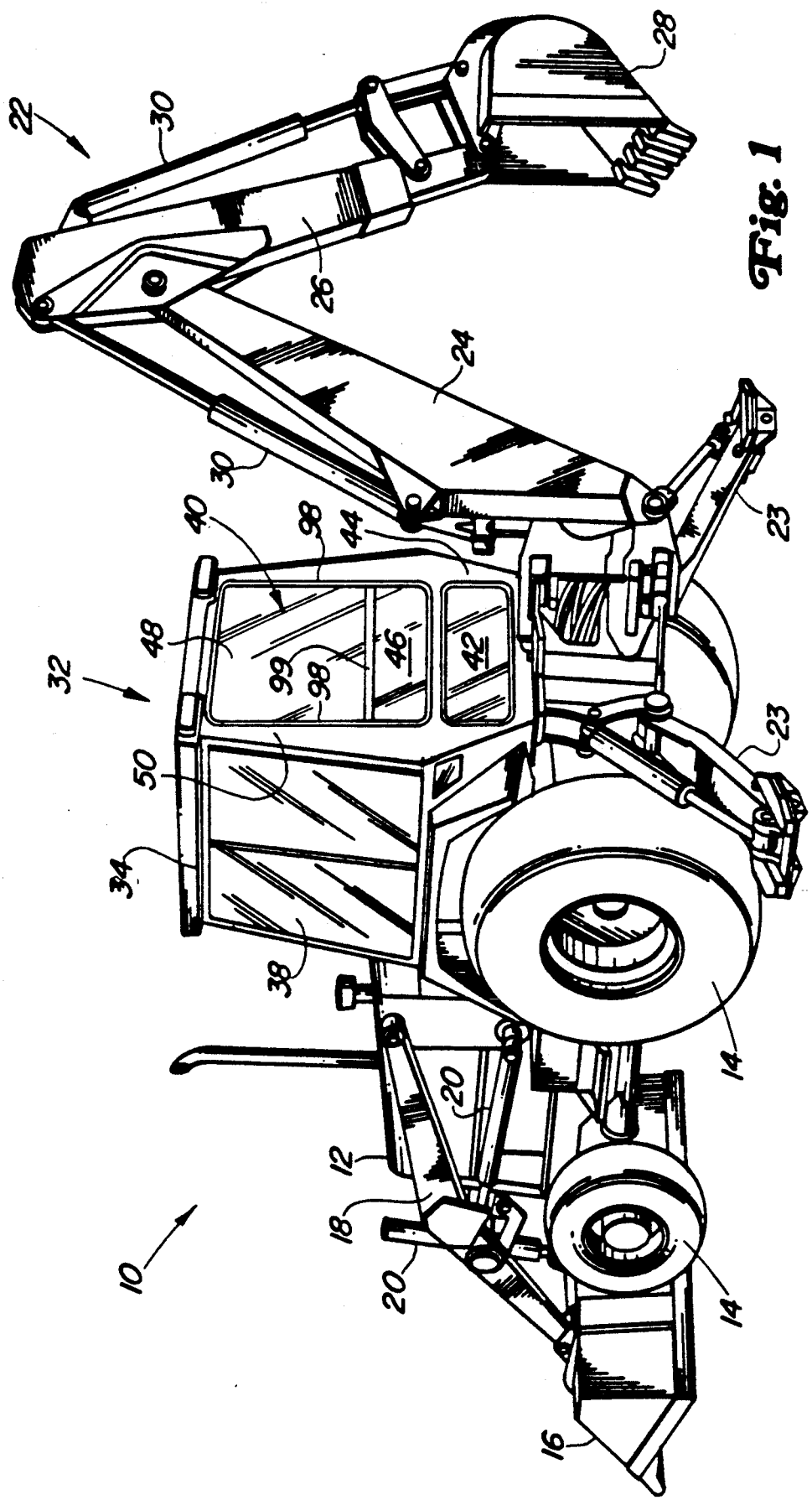

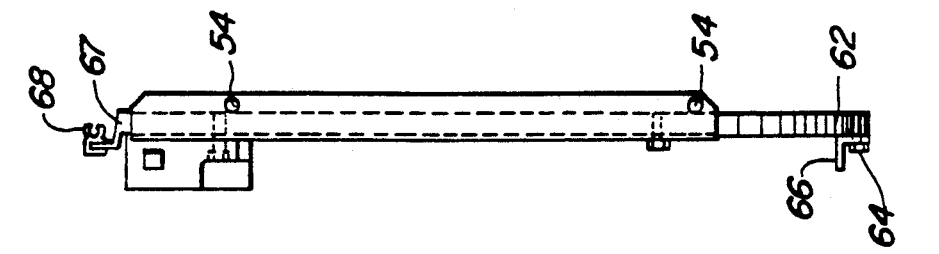
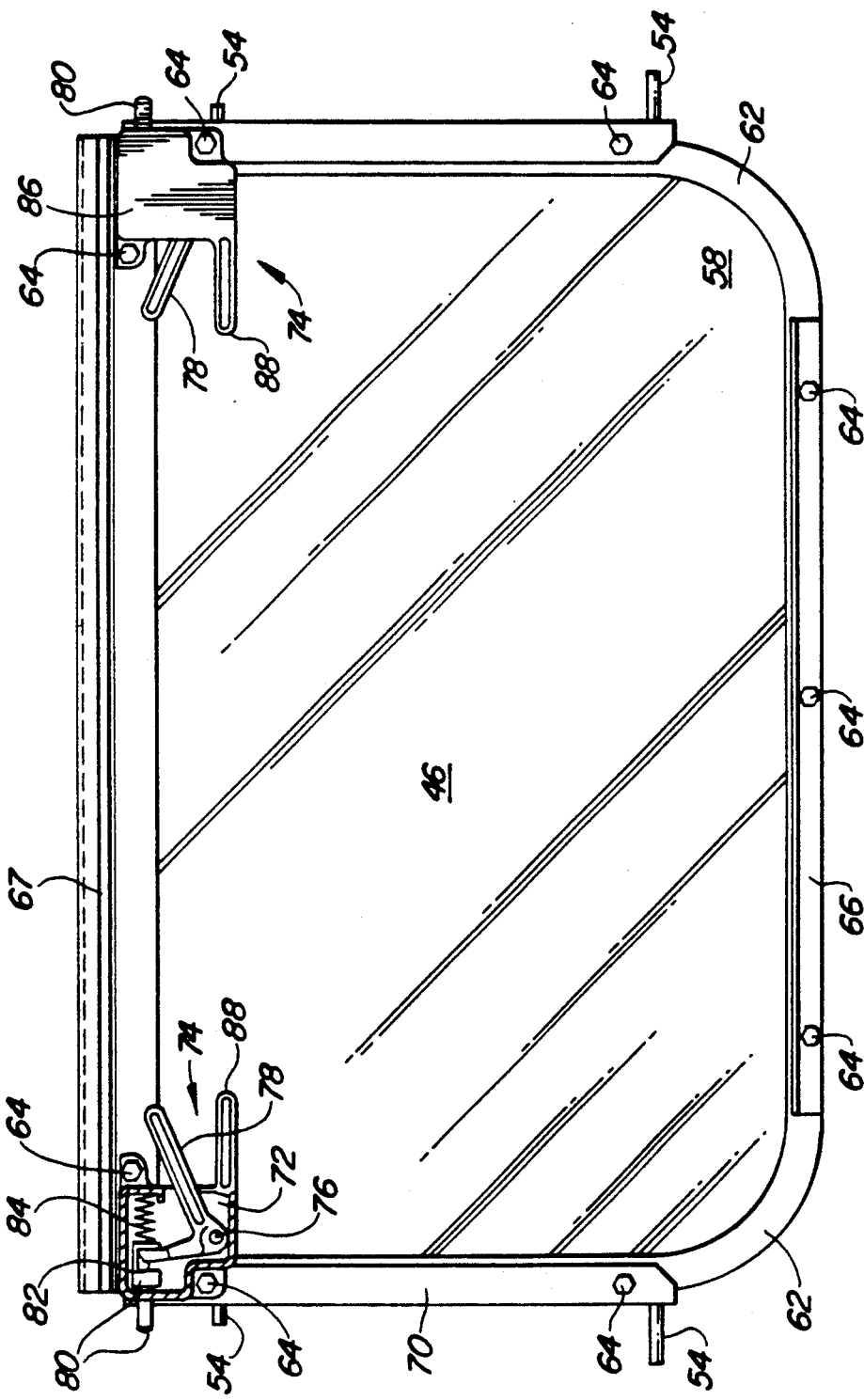

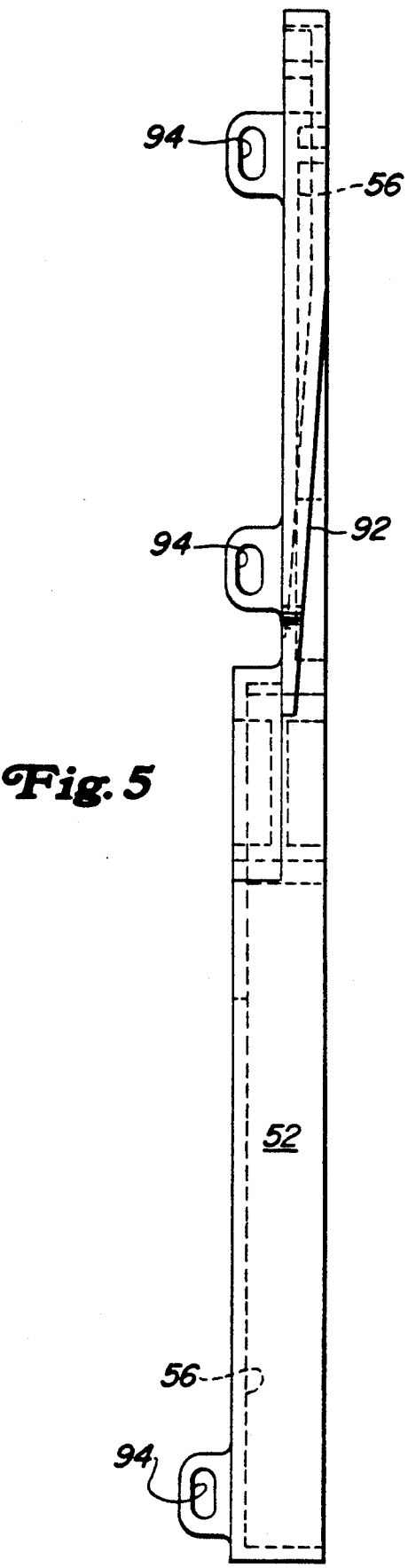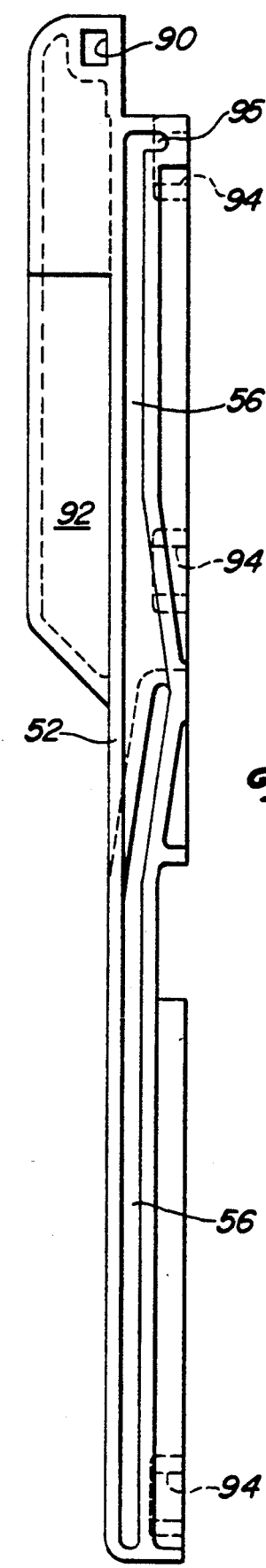
Fig. 5
Fig. 4

REAR WINDOW FOR A TRACTOR CAB

BACKGROUND OF THE INVENTION

1. Field of the Invention

The present invention is directed to window structures for tractor cabs, and specifically the rear window structure for a loader backhoe.

2. Description of the Prior Art

Tractors such as loader backhoes are popular work vehicles used in a variety of work operations. The front of the tractor is provided with a loader bucket, and the rear of the vehicle is provided with a backhoe. Many times these vehicles are provided with operator cabs to shield the operator from the elements. It is important that the cabs have adequate visibility. In addition it is desirable that the cabs have windows that can be opened.

The assignee of the present patent application currently manufactures a line of loader backhoes. These backhoes are provided with flat rear windows having two panels. The two panels are mounted to a frame defined by the cab. The bottom panel is releasably secured to the frame and the top panel, so that when it is to be removed the bottom panel is removed and mounted to the inside surface of the top panel. The top panel is pivotally mounted to the cab. After the bottom panel is mounted to the top panel, the top panel can be pivoted inwardly and upwardly and secured to the inside roof of the cab. In this way both panels are opened and stored out of the operators way.

SUMMARY

It is the main object of the present invention to provide an improved rear window for a cab of a tractor that can be opened and stored with a minimum amount of effort by the operator.

The rear window of the present invention comprises three vertically arranged panels. The top panel is pivotally coupled to the cab so it can be pivoted inwardly and secured to the inside roof of the cab. The bottom panel is stationary and cannot be opened. The middle panel is slidably coupled to guide tracks mounted to the side of the cab. The middle panel can be slid downwardly overlapping the bottom panel when opened and upwardly when closed.

The guide tracks are provided with slots that define the paths along which the middle panel may move. The middle panel itself is provided with pins that extend into the slots. In opening the middle panel, it is first moved inwardly and then downwardly towards the floor of the cab. In closing the middle panel it is moved upwardly then outwardly.

The middle panel is also provided with two latches for latching the panel into the closed position. These latches are provided with spring biassed latching pins that engage a latching aperture formed in the guide tracks. The guide tracks are also provided with a ramp for driving the spring biassed latching pin inwardly when the middle panel is raised from its opened positioned to its closed position.

BRIEF DESCRIPTION OF THE DRAWINGS

FIG. 1 is a rear perspective view of a loader backhoe.

FIG. 2 is an interior view of the middle panel showing in cross section the left latch assembly.

FIG. 3 is a cross sectional side view of the middle panel.

FIG. 4 is the side view of the left guide track.

FIG. 5 is the rear view of the left guide track.

DETAILED DESCRIPTION

The loader backhoe illustrated in FIG. 1 comprises a tractor 10 having a supporting frame 12 and downwardly extending ground engaging means 14. In the illustrated embodiment, the ground engaging means comprises wheels which support and propel the vehicle. The front of the tractor is provided with a loader bucket 16, a loader boom 18 and hydraulic cylinders 20 for controlling the operation of the loader bucket and boom.

The rear of the tractor is provided with a backhoe 22 having stabilizer legs 23, a boom 24, a dipper stick 26, a bucket 28, and hydraulic cylinders 30 for manipulating the backhoe.

The operator controls the operation of the vehicle from cab 32 mounted to the supporting frame. The cab is provided with a frame supporting a roof 34, a front window, side windows 38 and flat rear window 40. The flat rear window comprises three panels. The bottom panel 42 is stationary and held in a bottom frame 44 formed by the cab. The middle panel 46 and the top panel 48 can be opened to provide better visibility and ventilation. The middle and top panels are held in top frame 50 formed by the cab.

Although the present invention is being described as being a three panel rear window, the invention could also be used on a two panel rear window. In such a configuration the stationary bottom window would be eliminated and the top panel would become the upper panel and the middle panel would become the lower panel.

The top panel is pivotally mounted to the top of the cab in a conventional manner, so that it can be pivoted inwardly and secured to the inside roof of the cab by suitable latches, not shown.

The middle panel 46, best illustrated in FIGS. 2 and 3, is slidably mounted to the cab by vertically extending guide tracks 52, best illustrated in FIGS. 4 and 5. The guide tracks are mounted to the cab on both sides of the middle panel. The middle panel is provided with guide pins 54 that engage guide slots 56 formed in the guide tracks.

The middle panel comprises a transparent glass panel 58 having an edge that is covered by an aluminum extrusion 62 that is bolted to the glass panel by bolts 64. A reinforcing member 66 is bolted to the bottom edge of the middle panel. A sealing channel 67 is bolted to the top edge of the middle panel and may be provided with a compressible tubular sealing element 68.

Two side metal channels 70 are bolted to the side edges of the middle panel. Guide pins 54 are integrally formed on these metal channels. Each of the metal channels 70 are provided with plates 72 forming the backing member for latches 74. Each plate 72 is provided with an integral pivot pin 76.

The latches 74 comprise a bell crank release handle 78 which is pivotally mounted to pivot pin 76; a latching pin 80 that is operatively coupled to the bell crank release handle 78 by indentation 82; a spring 84 biassing the latching pin outwardly; and a plastic cover 86 having a stationary handle 88. The box is also provided with a longitudinal internal rib, not shown, which engages a longitudinal guide groove formed in the pin.

To release the latch and lower the window from its closed position the operator depresses both handles 78 pulling latching pins 80 out of the latching apertures 90 formed on the guide tracks.

The guide tracks 52, best illustrated in FIGS. 4 and 5, are formed from plastic and are provided with guide slots 56, latching aperture 90, ramp 92 and mounting apertures 94. The tracks are bolted to the top frame 50 at mounting apertures 94. Guide pins 54 are located in guide slots 56 for controlling the movement of the middle panel. The slots are vertically arranged except for latching portion 95 that extends horizontally.

The configuration of the guide slots forms a path for the guide pins and thereby the middle panel. When the middle panel is being closed the panel must first be pulled upwardly so the guide pins ride in the vertical portion of the guide slots and then be pushed outwardly, so that the top guide pins can be pushed into latching portions 90 of the guide slots. When the middle panel is pushed outwardly, the spring biassed latching pins become aligned with the latching apertures, latching the window into its closed position.

In opening the middle panel this operation is reversed, in that the latches are released by depressing the handles 78. The middle panel is then pulled inwardly and then downwardly until it overlaps the bottom panel. It should be noted that the internal edge of the top frame 50 is provided with a compressible tubular sealing member 68, When closing the middle panel by pushing it outwardly this sealing member is compressed forming a seal with the middle panel. Similarly then the middle panel is being opened and the latches are released this sealing member tends to force the middle panel inwardly.

The ramps 92 automatically depress the latching pins 80 when the window is being raised. In this way the latches do not have to be triggered when closing the middle panel. As the spring biassed latching pins are moved up the ramp the ramp drives them inwardly. When the panel is pushed forward, along the latching portions 90 of the guide slots, the latching pins engage the latching apertures locking the middle panel in place.

The bottom edge of the top panel is provided with an overlapping sealing assembly 99 which overlaps the top edge of the middle panel. Tubular sealing element 68 engages the inside surface of the overlapping sealing assembly 99 forming a seal between the middle panel and the top panel. To open the top panel, the middle panel must be opened first to provide clearance for the top panel to pivot inwardly. Similarly when closing the rear window, it is important to close the top panel first and then close the middle panel.

This invention should not be limited by the above described embodiments, but should be limited solely by the claims that follow.

We claim:

1. A tractor for performing a work operation, the tractor comprising:
    a supporting frame having a front and a rear;
    ground engaging means extending from the supporting frame for supporting and propelling the tractor;
    a work implement for performing a work operations is coupled to the rear of the supporting frame;
    a cab is mounted to the supporting frame for housing the operator, the cab having a front window facing the front of the supporting frame, side windows and a flat rear window;
    the rear window is provided with three flat panels vertically arranged one on top of the other, the bottom panel is stationary, the top panel is pivotally coupled to the cab for opening and closing this panel, the middle panel is slidably coupled to the cab for opening and closing the middle panel, the middle panel has two positions, a middle position for closing the middle panel and an open position overlapping the bottom panel.

2. A tractor as defined by claim 1 wherein the cab is provided with two guide tracks having slots in which the middle panel is slidably received.

3. A tractor as defined by claim 2 wherein the middle panel is provided with guide pins that extend into the slots.

4. A tractor as defined by claim 3 wherein the guide slots define a path that when opening the middle panel an operator first pulls the middle panel inwardly into the cab before sliding it downwardly, and when closing the middle panel an operator first pulls the middle panel upwardly and then pushes the middle panel outwardly.

5. A tractor as defined by claim 4 wherein the cab is provided with a top frame and a bottom frame for holding the rear window, the bottom frame holds the stationary bottom panel and the top frame holds the top and middle panels.

6. A tractor as defined by claim 5 wherein the top frame is provided with an inner edge that is provided with a compressible tubular seal for sealing the top and middle panels where they contact the top frame.

7. A tractor as defined by claim 6 wherein the top panel is provided with a bottom edge and the middle panel is provided with a top edge, the bottom edge of the top panel is provided with an overlapping seal which contacts the top edge of the middle panel in a sealing relationship when the middle panel is closed and pressed against the closed top panel.

8. A tractor as defined by claim 7 wherein the middle panel is provided with two latches located adjacent to the guide tracks for latching the middle panel into a closed position 9. A tractor as defined by claim 8 wherein each latch is provided with a latching pin and each guide track is provided with a latching aperture for receiving the latching pin.

10. A tractor as defined by claim 9 wherein the latching pins are spring biassed outwardly into the latching aperture and each guide track is provided with a ramp structure contacting the latching pins when the middle panel is moved from an open to a closed position, the ramps driving the latching pins inwardly until the latching pins contact the latching apertures.

11. A cab for housing an operator on a tractor, the cab comprising:
    a frame having a roof;
    a front window mounted to the frame;
    side windows mounted to the frame;
    a flat rear window mounted to the frame, the rear window is provided with two flat panels vertically arranged one on top of the other, the upper panel is pivotally coupled to the frame for opening and closing this panel, the lower panel is slidably coupled to the frame for opening and closing the lower panel, the lower panel has two positions, a closed position for closing the lower panel and an open position in which the lower panel is moved to a lower position.

12. A cab as defined by claim 11 wherein the frame is provided with two guide tracks having slots in which the lower panel is slidably received.

13. A cab as defined by claim 12 wherein the lower panel is provided with guide pins that extend into the slots.

14. A cab as defined by claim 13 wherein the guide slots define a path that when opening the lower panel an operator first pulls the lower panel inwardly into the cab before sliding it downwardly, and when closing the lower panel an operator pulls the lower panel upwardly and then pushes the lower panel outwardly.

15. A cab as defined by claim 14 wherein the frame is provided with an inner edge that is provided with a compressible tubular seal for sealing the upper and lower panels where they contact the frame.

16. A cab as defined by claim 15 wherein the upper panel is provided with a bottom edge and the lower panel is provided with a top edge, the bottom edge of the upper panel is provided with an overlapping seal which contacts the top edge of the lower panel in a sealing relationship when the lower panel is closed and pressed against the closed upper panel.

17. A cab as defined by claim 16 wherein the lower panel is provided with two latches located adjacent to the guide tracks for latching the lower panel into a closed position.

18. A cab as defined by claim 17 wherein each latch is provided with a latching pin and each guide track is provided with a latching aperture for receiving the latching pin.

19. A cab as defined by claim 18 wherein the latching pins are spring biassed outwardly into the latching aperture and each guide track is provided with a ramp structure contacting the latching pins when the lower panel is moved from an open to a closed position, the ramps driving the latching pins inwardly until the latching pins contact the latching apertures.

* * * * *